United States Patent [19]

Lorsbach

[11] Patent Number: 4,875,548

[45] Date of Patent: Oct. 24, 1989

[54] JUMP RESCUE APPARATUS

[76] Inventor: Peter Lorsbach, Schwertstrasse 59, 5650 Solingen 1, Fed. Rep. of Germany

[21] Appl. No.: 129,384

[22] Filed: Nov. 24, 1987

Related U.S. Application Data

[63] Continuation-in-part of Ser. No. 861,060, May 8, 1986, abandoned.

[30] Foreign Application Priority Data

May 9, 1985 [DE] Fed. Rep. of Germany ....... 3516676

[51] Int. Cl.⁴ ............ F16K 17/36

[52] U.S. Cl. ............ 182/137

[58] Field of Search ............ 182/137-140

[56] References Cited

U.S. PATENT DOCUMENTS

| | | | |
|---|---|---|---|
| 2,434,641 | 1/1948 | Burns | 5/449 |
| 2,906,366 | 9/1959 | Mapes | 182/139 |
| 3,369,808 | 2/1968 | Sconce | 182/137 |
| 3,391,414 | 7/1968 | Gordon | 182/139 X |
| 3,603,430 | 9/1971 | Kendall | 182/137 |
| 3,843,150 | 10/1974 | Harada | 182/137 |
| 4,255,824 | 3/1981 | Pertchik | 5/449 |
| 4,283,864 | 8/1981 | Lipfert | 5/448 |

FOREIGN PATENT DOCUMENTS

| | | | |
|---|---|---|---|
| 136573 | 7/1979 | Fed. Rep. of Germany | 182/137 |
| 542335 | 1/1942 | United Kingdom | 182/137 |
| 705245 | 3/1954 | United Kingdom | 182/137 |

*Primary Examiner*—Alvin C. Chin-Shue

*Attorney, Agent, or Firm*—Becker & Becker, Inc.

[57] ABSTRACT

A jump rescue apparatus having a jump surface which is made of a tensioned fabric that is carried by a support mechanism formed from inflatable tubes. To achieve dissipation of energy when a person who is to be rescued jumps onto the apparatus, the support mechanism, which is formed by a framework, has a covering extending around it. The support mechanism is elastically yieldingly deformable when a person jumps onto the apparatus. After the covering is relieved of the load of a person, it returns to its original shape. Furthermore, the covering is provided with a plurality of flow restrictors for the passage of air.

1 Claim, 2 Drawing Sheets

JUMP RESCUE APPARATUS

This is a continuation-in-part of co-pending parent application U.S. Ser. No. 861,060-Lorsbach filed May 8, 1986, now abandoned.

BACKGROUND OF THE INVENTION

1. Field of the Invention

The present invention relates to a jump or lifesaving rescue apparatus having a jump surface that is made of a flexible, inextensible, tensioned fabric or the like, and is carried by a support mechanism formed from inflatable hoses or tubes and disposed below the jump surface.

2. Description of the Prior Art

With heretofore known jump rescue apparatus of this general type, the support mechanism acts like a spring, in other words, like an element that effects an immediate spring-like resetting action. This produces a trampoline-like effect that can lead to injury to the person that is to be rescued. Unfortunately, such a spring-like action cannot be precluded with the heretofore known apparatus because too little energy is dissipated when a person jumps onto the apparatus.

It is essentially an object of the present invention to eliminate the aforementioned drawbacks. Furthermore, energy is to be dissipated when a person jumps onto the inventive apparatus, with such dissipation being achieved in such a way that the person who is jumping is received in an elastically soft manner and not in a spring-like manner.

BRIEF DESCRIPTION OF THE DRAWING

These objects, and other objects and advantages of the present invention, will appear more clearly from the following specification in conjunction with the accompanying schematic drawing, in which.

FIGT. 4 is a side view of an especially advantageous embodiment of the jump rescue apparatus of the present invention.

Figure 4:
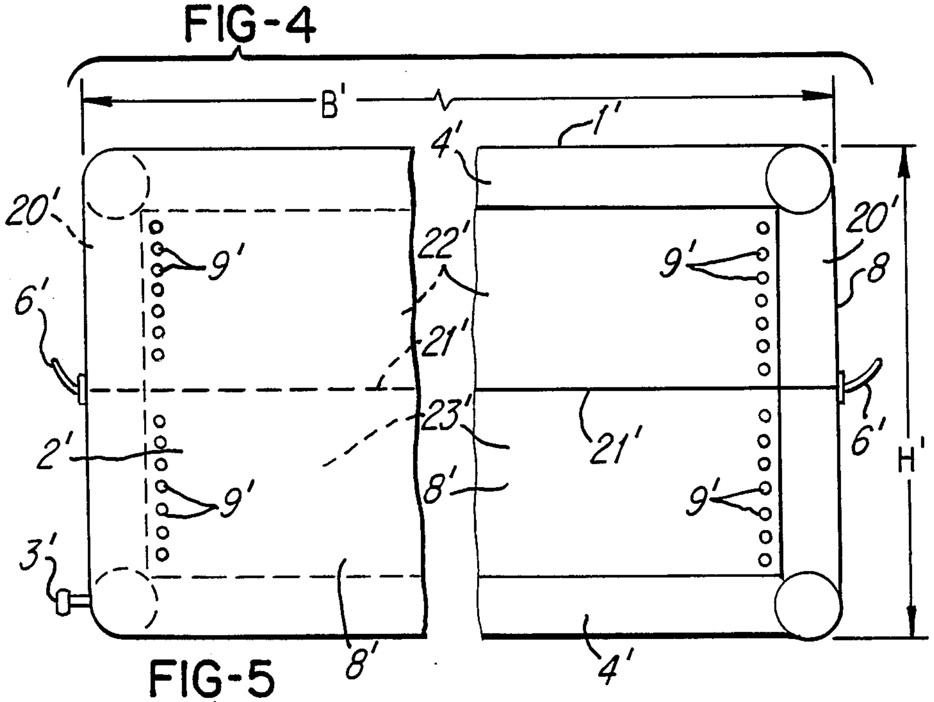
Figure 5:
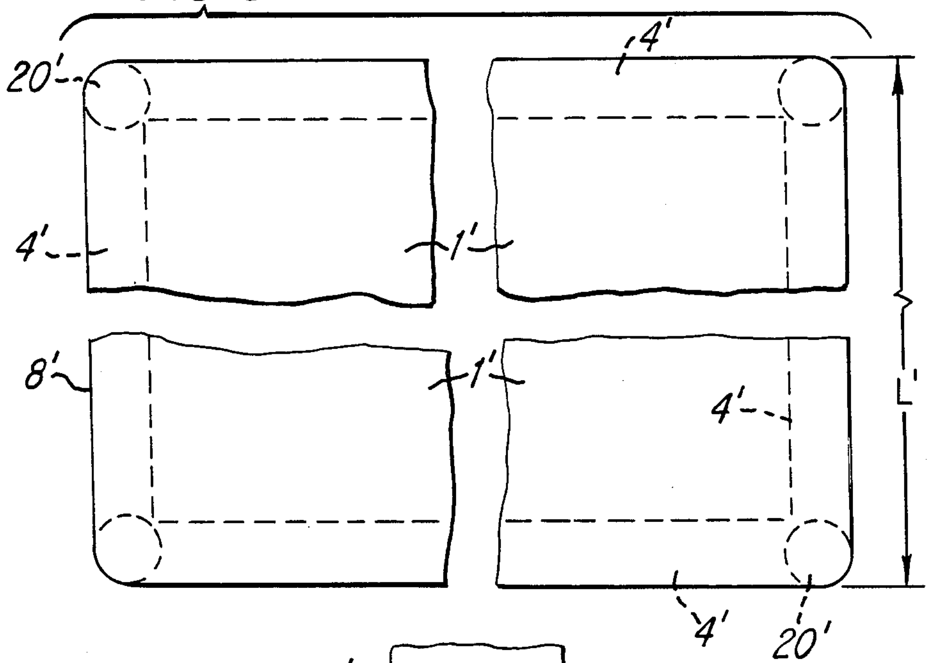

FIG. 5 is a plan view of the apparatus of FIG. 4; and

Figure 6:
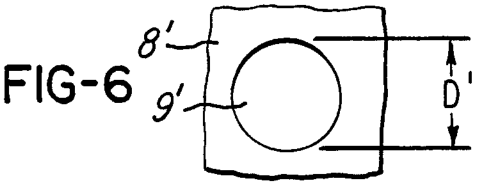

FIG. 6 is a fragmentary view that shows a detail of FIG. 4, whereby there is to be mentioned that illustrations according to FIGS. 4 and 5 represent only portions of the apparatus subject to utilization of break lines.

SUMMARY OF THE INVENTION

Pursuant to the present invention, the support mechanism of the rescue apparatus is formed by a framework or structure around which extends a flexible covering that is provided with a jump surface; the support mechanism is elastically yieldingly deformable when somebody jumps on the apparatus, and the covering can be restored or returned to its starting shape after the load thereon has been removed; furthermore, the covering is provided with one or more air-passage openings embodied as flow-restrictors.

The important thing therefore is a support mechanism that is in the form of a framework or other similar structure, and that cooperates with a covering that extends around the support mechanism, with the covering being pierced or otherwise being provided with opening means for forming a flow restriction. This latter effect can be accomplished, for example, by small holes, by valves, or even by portions of a permeable fabric or the like.

The dimensions of the support mechanism are expediently such that they impart to the covering in the operating condition of the rescue apparatus a slight and possibly elastic prestress, thus assuring the rigidity of the covering.

With an apparatus embodied in the inventive manner, when the person who is to be rescued jumps onto the apparatus, the support mechanism is deformed by collapsing, bending, buckling, etc. of its strutlike elements, with a certain amount of pressure increase occurring within the covering. However, this pressure cannot increase arbitrarily. Rather, the pressure medium, in other words, the air enclosed by the covering, flows through the aforementioned restrictor openings in such a manner that an extensive dissipation of energy takes place.

The size, design, and arrangement of these passages must be determined in regard to the rigidity of the support mechanism, with the size of the jump rescue apparatus naturally also having to be taken into consideration. As a whole, the jump rescue apparatus can have, for example, a parallelepipedal or cylindrical shape, but can, of course, also have a polygonal or elliptical design. The operational height of the jump surface can be approximately 80 to 120 cm above the ground.

In order to assure the rigidity of the covering in the operating condition of the apparatus, and at the same time to assure that a type of centering action occurs when the person who is to be rescued jumps onto the apparatus, with this centering effect being intended to preclude the person from being deflected to the side, special features are provided for the support mechanism. The elements of the support mechanism should expediently contact or act upon the covering at least in the region of the upper edges of the jump surface, and possibly also in the vicinity of the bottom surface of the covering. This can be accomplished with closed frames that are shaped in conformity to the plan form of the covering. However, it is also possible to provide the support mechanism with support members that expediently extend into the upper corners of the cover, and in particular potentially in such a way that they extend at an angle such that, when viewed from the center of the apparatus, they rise steeply at an angle toward the outside.

Subsequent to the rescue of the person, the inventive apparatus experiences a resetting and, to a certain extent, a straightening-out of its support mechanism, whereby the covering is again returned to its original shape, which, however, can occur only by having atmospheric air flow back in or otherwise return to the interior of the covering. Consequently, the inventive apparatus can be readily standardized with a compressed-air pump, whereby under mechanical pressure, the air is withdrawn in a restricted manner, and whereby during return movement of the mechanical parts, and intake process for filling the space of the covering takes place.

Further specific features of the present invention will be described in detail subsequently.

DESCRIPTION OF PREFERRED EMBODIMENTS

Referring now to the drawing in detail, all of the illustrated apparatus have an approximately square jump surface 1, i.e. the surface onto which the person who is to be rescued jumps. The jump surface 1 is formed by the upper portion of a covering 2 that extends around the entire apparatus and comprises a very dense fabric, an inextensible thin sheet, a rubberized fabric, or some other flexible, sheet-like product that is nonetheless relatively inextensible. The side edges of the jump surface 1 are considerably longer than are the vertical edges of the apparatus, although these proportions are not mandatory; these proportions are also a function of the size of the jump surface 1.

In the state of rest, the rigidity of the covering 2 is assured by a support frame that is disposed within the covering. This support frame comprises flexible air hoses or tubes, all of which expediently communicate with one another so that they can be filled or inflated with a single compressedair connector 3. Pursuant to the embodiment of FIG. 1, the support frame comprises two closed frames 4 that are disposed in the vicinity of the upper and lower peripheral edges of the apparatus; the two frames 4 are connected with one another in the corners via angular strut-like members 5. These strut-like members 5 are bent in such a way that the knees of the bends point toward the center of the apparatus.

Handles 6 can be provided in the vicinity of the upper rim of the apparatus. Furthermore, it is also possible to make the upper and lower peripheral edges, i.e. those edges of the covering adjacent to the frames 4, inextensible by means of a continuous cord (see reference numeral 7).

The side walls 8 of the covering are preferably provided with relatively small holes 9 that are disposed approximately in the region of the center of each side wall. These holes 9 form flow restrictors for the enclosed air when the latter flows out, but also form air-inlet openings when the apparatus is converted back to the shape shown in FIG. 1. The size of the holes 9 depends upon the size of the apparatus; the holes are preferably smaller than 1/100 of the associated side wall surface 8. To the extent possible, and for reasons of symmetry, the holes 9 should be uniformly distributed over the periphery of the apparatus.

If the rescue apparatus is located at the site, and a person who is to be rescued jumps onto the jump surface 1, an appropriate deformation of the apparatus results, with the strut-like members 5 collapsing or folding into the center of the apparatus, and possibly with the upper frame of the support becoming deformed. At the same time, the pressure within the covering 2 increases. However, a high compression cannot occur because, under stress, the air can escape via the holes 9, so that a not inconsiderable energy dissipation takes place.

Figure 1:
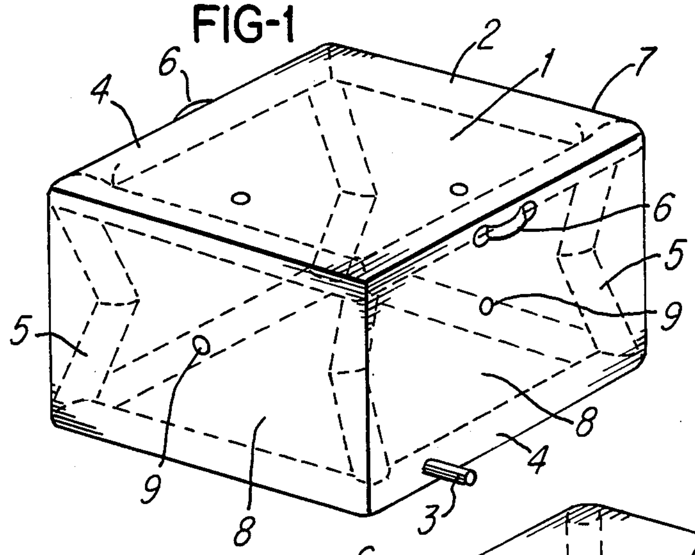
FIGS. 1, 2 and 3 each diagrammatically illustrate a respective exemplary embodiment of a jump rescue apparatus of the present invention.

After the person has been rescued, the strutlike members 5 straighten out somewhat, i.e. the support disposed within the covering 2 tries once again to assume the shape shown in FIG. 1, whereby the air that was expelled must again be drawn in via the holes 9. Special provisions, such as check valves, can also be provided to enable as rapid a straightening out or intake of air as possible, in order to again provide as quickly as possible the operating state of the apparatus.

Figure 2:
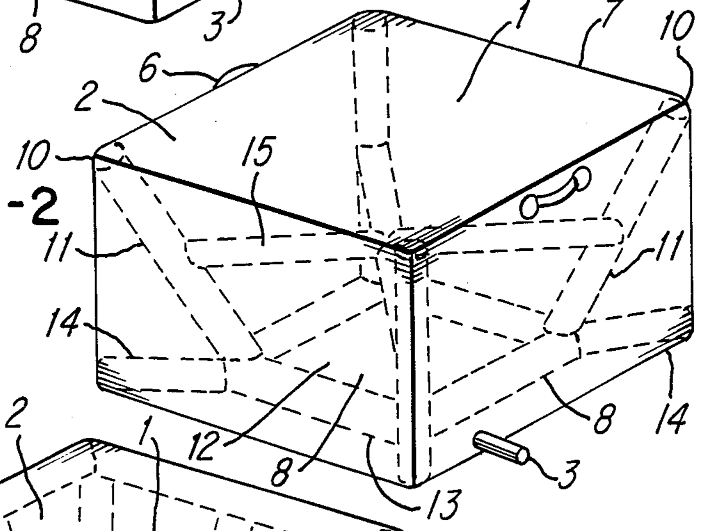

In the embodiment of FIG. 2, the upper corners 10 of the covering 2 are supported only by pneumatic support members 11. Thus, continuous frames 4 disposed at the upper or lower peripheral edge of the covering 2 are dispensed with. Merely in the region of the bottom surface 12 a small frame 13 is provided, from which horizontal support members 14 extend into the lower corners. The support members 11, which extend upwardly and outwardly at an angle, proceed from the corners of the frame 13.

In order to make the support members more rigid, they can be connected by a pneumatic cross-shaped piece 15 that is disposed approximately halfway up the apparatus.

Figure 3:
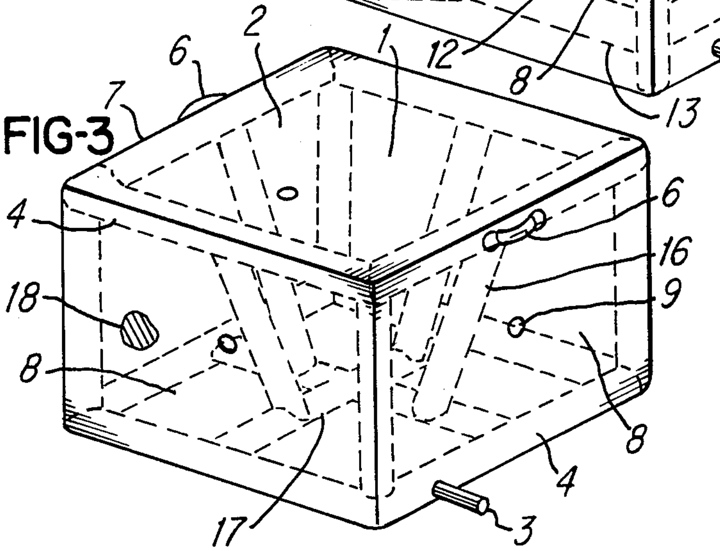

In the embodiment of FIG. 3, the two frames 4 of FIG. 1 are again provided, but this time the elements of the frames are supported halfway along their length by inclined pneumatic support members 16. The lower end of each of these support members 16 is pneumatically connected with a cross-shaped member 17 that is disposed in the bottom surface of the apparatus.

In the embodiment of FIG. 3, the holes 9 can be replaced by a wide-meshed configuration of the side walls 8. This restrictor-like configuration is indicated by the reference numeral 18. The mesh size depends upon the design of the apparatus.

With the embodiments of FIGS. 2 and 3, the same effect as described in connection with the embodiment of FIG. 1 occurs. However, it is important to note that the apparatus of FIG. 2 is relatively soft, and of all of the illustrated apparatus, the embodiment of FIG. 3 is the most rigid. The rigidity or flexibility of the apparatus can, of course, be attributed to the configuration of the struts or framework of the support for the covering 2.

The apparatus according to FIGS. 4 and 5 has a quadratic or rectangular jump surface 1' which is formed by a covering 2' that is practically air impermeable or impervious to passage of air therethrough. The casing or shell stiffness of the covering 2' is assured by a support frame consisting of bendable or flexible air hoses or tubes and this support frame has air pressure connection means 3' therewith. Two quadratic frames 4' are located above and below in a region of the peripheral or surrounding edges of the apparatus within the covering 2'; these two quadratic frames 4' are connected in the corners by vertical or upright supports, columns or pillars 20' extending straight which also determine the four corners of the apparatus. The two quadratic frames 4' and the supports, pillars or columns 20' are air hoses or tubes connected among each other.

The apparatus has an air content or volume of practically 20 square meters (20 $m^3$) for a height of fall or drop up to 20 meters by the person to be saved. Accordingly the jump surface 1' is quadratic or rectangular and the width B' and also the length L' amount to 3.5 meters, while the height of the apparatus amounts to 1.7 meters.

Important under these circumstances and preconditions there can be noted to be included the measurement or dimensioning, the arrangement and the distribution of the individual holes 9' which here also serve as flow throttles which accordingly permit the air to discharge or flow out in order to convert the kinetic energy of the falling or dropping person into movement energy. On the basis of extensive investigations there is effective and advantageous when the holes 9' have a diameter in a range of 40 mm to 80 mm, preferably however having a diameter of approximately 60 mm. In each sidewall 8' moreover there are 28 holes 9', so that with the four sidewalls 8', a total of 112 holes are provided collectively. This means that per cubic meter ($m^3$) air content of the apparatus that four to seven holes 9' are provided, preferably however approximately 5.5 such holes 9'.

With that also the configuration, construction, shape, form and contour of the apparatus must be considered to have meaning and importance. With a quadratic jump surface 1' there is noted that the ratio or relationship H':B' (height to width) amounts to a value in a range of approximately 1:1.7 to 1:2.5, particularly however amounting to 1:2, as illustrated in the embodiment according to FIGS. 4 and 5. The number of holes 9' with the apparatus according to this embodiment can amount to a value in a range of 80 to 140. As mentioned, 112 openings of each approximately 60 mm diameter D' are provided with the sample embodiment.

In order additionally to permit the holes 9' to be especially effective, particularly under circumstances when a deformation of the apparatus occurs or results via the jumping thereon, then the holes 9' are provided in the region or range of the corners of the apparatus, and moreover preferably such holes 9' are arranged and located vertically or upright one above the other adjoining the upright or vertical struts or supports 20', especially with that on both of opposite sides of each strut or support 20', so that accordingly for all four side walls 8' there is employed an arrangement according to the illustration of the view of FIG. 4.

Additionally there is important that the apparatus respectively the hollow space or chamber thereof is partitioned or subdivided by a transverse wall, partition or bulk head 21' in essence and practically air impermeable or impervious to passage of air so as to subdivide the hollow space or chamber into an upper air chamber 22' and a lower air chamber 23'. Such a subdivision has an advantage that there results a compensation or equalization of the pressure loading inside the apparatus, when the person to be saved deforms the jump surface 1'. There results a more uniform and equalized pressure engagement of the inner chamber of the apparatus.

There is to be understood that the edges of the transverse wall, partition or bulk head 21' are connected with the side walls 8' and is purposeful and expedient when at these connection locations simultaneously the fastening locations for the handle 6' are provided therewith in order to increase the strength, stability and rigidity of the apparatus.

The present invention is, of course, in no way restricted to the specific disclosure of the specification and drawing, but also encompasses any modifications within the scope of the appended claims.

What I claim is:

1. A jump rescue apparatus, comprising the improvement in combination therewith including:

a pneumatic framework made of inflatable tubes; and a flexible and substantially inextensible tensioned fabric covering that extends around said pneumatic framework of inflatable tubes disposed below said covering which is supported thereby, with said covering having a pre-tensioned jump surface onto which a person who is to be rescued can jump safely, and with said pre-tensioned jump surface including edges and being supported only along the edges by said pneumatic framework in a tensioned condition; and with an approximately quadratic outline of said jump surface there is a ratio relationship of the height to the width of the apparatus within a range of approximately 1:1.7 to 1:2.5, preferably amounting to 1:2;

said pneumatic framework of inflatable tubes having a starting configuration and being elastically yieldingly deformable to accommodate a person jumping onto said pre-tensioned jump surface for energy dissipation in such a way that the person who is jumping is received in an elastically soft manner rather than in a spring-like manner, and after said person is no longer on said pre-tensioned jump surface, said pneumatic framework of inflatable tubes being adapted automatically and independently to return said covering that is reset rapidly to the starting configuration and returned substantially back to the position it had prior to the time the person jumped onto said pre-tensioned jump surface to allow use thereof again as quickly as possible to rescue another person; said tensioned fabric covering being provided with at least one air-passage means embodied particularly as flow-restriction means provided for air through-passage in a flow-throttling operation although open reciprocally irrespective of whether air is to flow in or out in connection with said pneumatic framework of inflatable tubes to obtain combination effect of said pneumatic framework via support only along edges coupled with said air-passage means, said air-passage means only being located in corner regions of the apparatus;

in a state of rest, said covering being provided with surfaces that are supported under pre-tension by said framework, said jump surface of said covering being provided with peripheral edges, and said framework includes elements that contact said covering at least in the region of said peripheral edges of said jump surface;

said covering being provided with corners, and said elements of said framework contact said corners, said covering having a bottom surface opposite said jump surface thereof, with both said bottom surface and said jump surface being respectively provided with peripheral edges; said inflatable tube framework includes at least one continuous closed frame, with at least one of said jump surface and said bottom surface having its peripheral edges adjacent one of said closed frames, one of said closed frames being located along said peripheral edges of said jump surface; said framework further including narrow support members for supporting said last-mentioned closed frame;

said air-passage means including a plurality of small openings for allowing air to leave said covering;

all of said inflatable tubes being interconnected, and an air inlet valve that communicates with one of said tubes and is disposed remote from said jump surface;

said inflatable tubes of said framework being effective practically exclusively in the edge region of said jump surface in such a way that the center of the latter is more yielding than the edge region thereof;

said air-passage means being embodied particularly as flow-restriction means open reciprocally irrespective of whether air is to flow in or out in connection with said pneumatic framework; said air-passage means being holes having a diameter in a range of 40 mm to 80 mm, preferably 60 mm, and for each cubic meter of air content volume of the apparatus there being a range of four to seven holes being provided therewith, said air-passage means only being located in corner regions of the apparatus;

said air-passage means being located at least on one side of supports located in corner regions of the apparatus;

said air-passage means being arranged in vertically extending rows one above the other; and a hollow space inside the apparatus that is subdivided by a partition wall extending transversely and practically air impermeable, said partition wall being located at substantially half the height level of the apparatus overall, whereby such hollow space is subdivided into two chambers formed on opposite sides of said partition wall and having holes of equal number arranged as said air-passage means of each of said two chambers; and said transversely extending partition wall having edges securely connected with side walls of said apparatus and further including handles arranged and fastened externally at said connection locations between the transversely extending wall with respect to said side walls of the apparatus.

* * * * *